United States Patent [19]
Norris et al.

[11] Patent Number: 5,262,613
[45] Date of Patent: Nov. 16, 1993

[54] LASER RETROFIT FOR MECHANICAL ENGRAVERS

[75] Inventors: Richard A. Norris, Scottsdale; Steven D. Allred, Mesa, both of Ariz.

[73] Assignee: General Laser, Inc., Scottsdale, Ariz.

[21] Appl. No.: 764,530

[22] Filed: Sep. 24, 1991

[51] Int. Cl.⁵ .............................................. B23K 26/00
[52] U.S. Cl. ............................................... 219/121.68
[58] Field of Search ................. 219/121.19, 121.20, 219/121.68, 121.69, 121.65, 121.66, 121.83, 121.82

[56] References Cited

U.S. PATENT DOCUMENTS

| | | | |
|---|---|---|---|
| 2,810,960 | 10/1957 | Johnson et al. | 33/18 |
| 3,339,279 | 9/1967 | Sovar et al. | 33/164.9 |
| 3,353,273 | 11/1967 | Sicking et al. | 33/18 |
| 3,588,439 | 6/1971 | Heller et al. | 219/121.68 |
| 4,352,973 | 10/1982 | Chase | 219/121.68 |
| 4,356,376 | 10/1982 | Komanduri et al. | 219/121.72 |
| 4,480,169 | 10/1984 | Macken | 219/121.68 |
| 4,564,736 | 1/1986 | Jones et al. | 219/121.6 |
| 4,758,848 | 7/1988 | Nakano | 346/108 |
| 4,851,061 | 7/1989 | Sorkoram | 156/63 |
| 4,985,780 | 1/1991 | Garnier et al. | 358/299 |

Primary Examiner—C. L. Albritton
Attorney, Agent, or Firm—Rosenbaum & Schwartz

[57] ABSTRACT

A laser assembly adapted to retrofit industrial mechanical engravers to convert the mechanical engraver to a laser engraver.

15 Claims, 3 Drawing Sheets

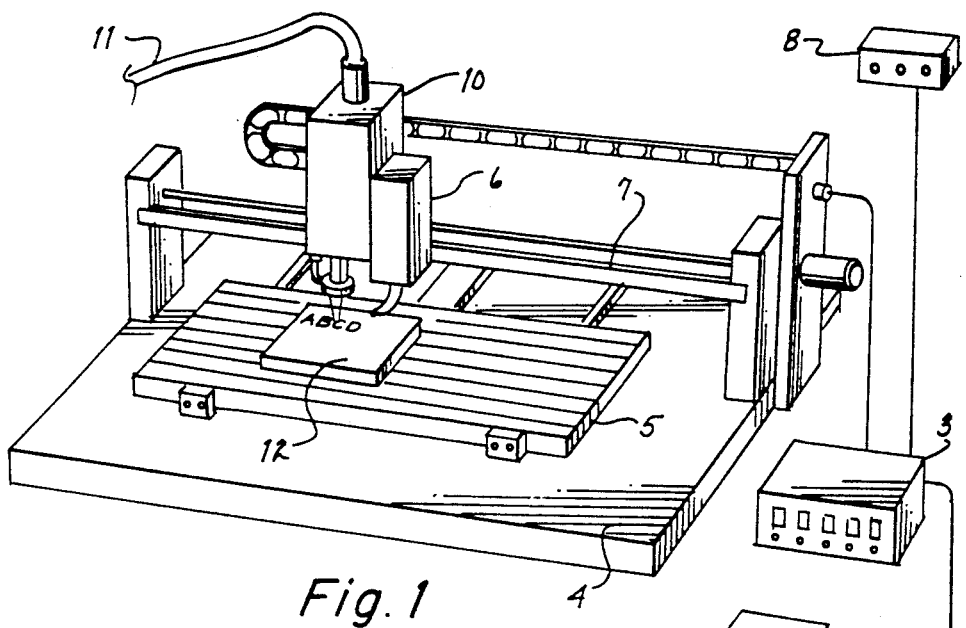
Fig. 1
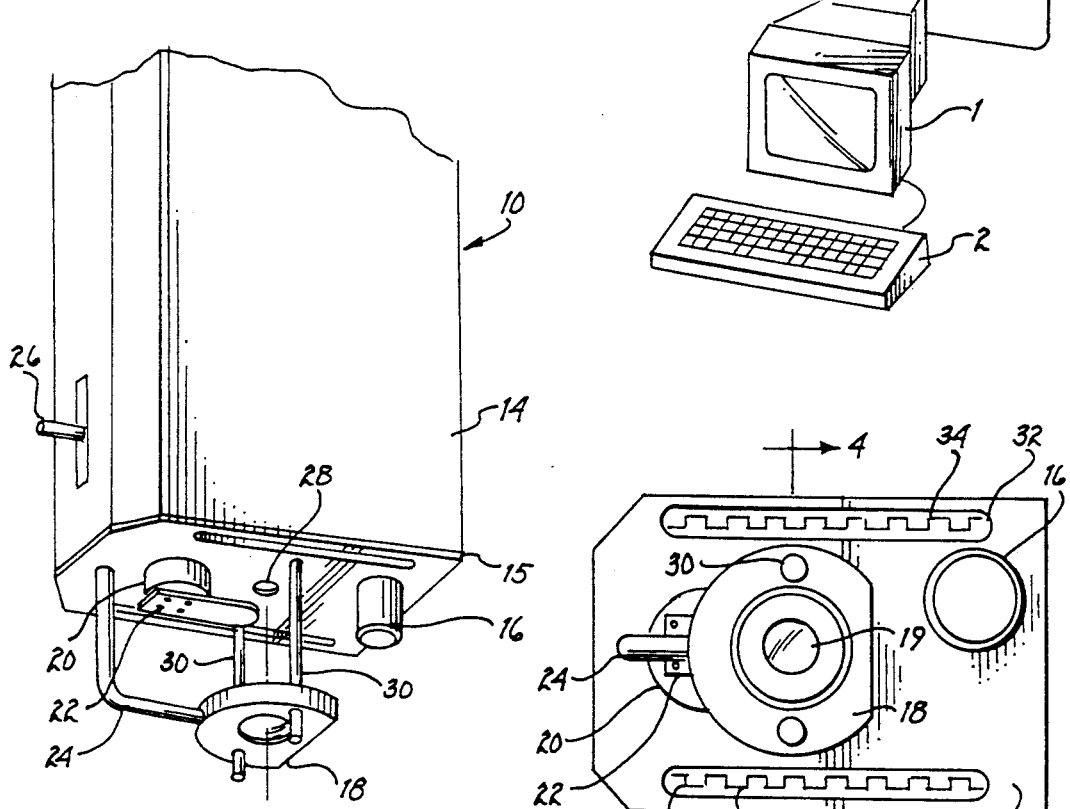
Fig. 2
Fig. 3

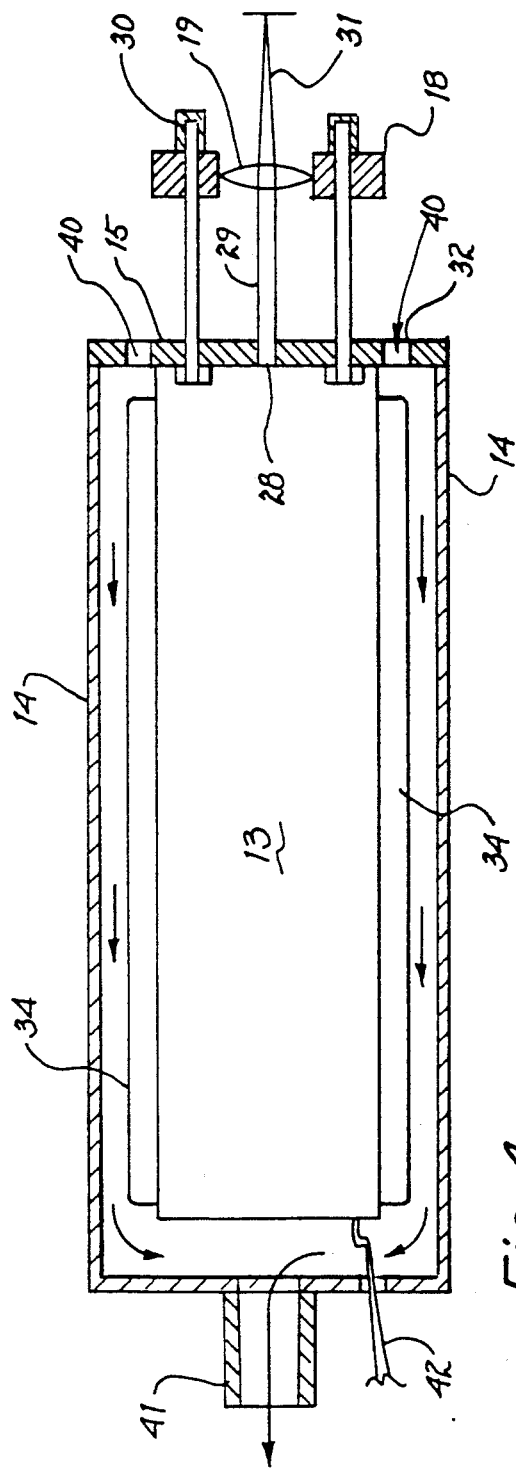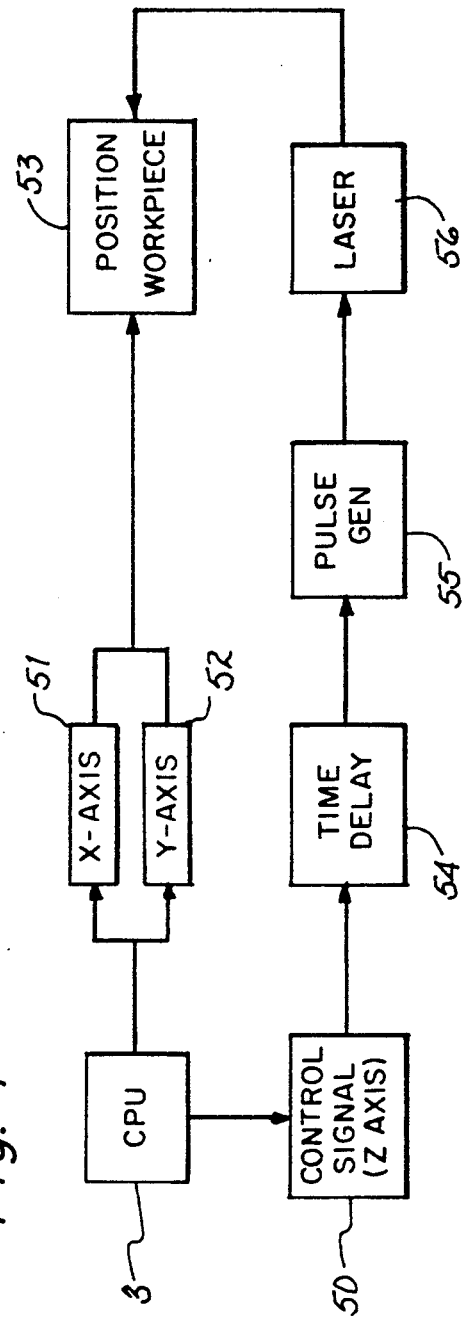

LASER RETROFIT FOR MECHANICAL ENGRAVERS

BACKGROUND OF THE INVENTION

The present invention relates generally to devices for engraving text or images onto a workpiece by removing portions of the workpiece corresponding to the engraved text or images. More particularly, the present invention relates to a laser assembly adapted to retrofit industrial mechanical engravers to convert the mechanical engraver to a laser engraver.

Generally, the present invention provides a laser assembly, which may employ any type of laser suitable for the material to be engraved, e.g., YAG, $CO_2$ or excimer laser. Mounting bracketry mounts the laser and associated focusing optics onto the mechanical engraver. Additional laser optics, such as mirrors and lenses, may also be employed with the laser to focus an engraving beam onto the material to be engraved. In conjunction with the laser, various electronics are supplied, such as a power supply, a pulse generator, and conducting wiring, which actuate the laser. The primary control component is a delay circuit which minimizes or adjustably suppresses the first laser pulse when an initiation signal is received from the controller. The first laser pulse typically emits too much energy which results in uneven marking depth and width at the point of initial marking. Neither conventional laser nor mechanical engraving systems compensate for the delay between the time that the start signal is received and movement of the engraver is initiated.

An example of an embodiment of the present invention is a laser system consisting of a mirror connected to the spindle, collet or chuck assembly of the mechanical engraver, and used in place of the engraving tool or bit. The mirror may consist of a single mirror and lens assembly with the laser mounted to the existing gantry assembly and movable with the gantry. The spindle, collet or chuck assembly moves on the gantry to emit a laser, which is directed, either by the optics onto the workpiece. Alternatively, the optics ma be mounted on the spindle, collet or chuck assembly and be moveable, with the laser mounted stationary, but in the optical path of the moveable mirror. Alternatively, a two-axis optical system may be utilized with a stationary mounted laser assembly. The focusing optics in all of these configurations may be either before or after the mirror assembly and the gantry is capable of either x, y axis motion or only x or only y axis motion with a moveable workpiece. For purposes of clarity, reference to x, y or z-axes refers to movement relative to a workpiece.

The invention provides a retrofit for existing mechanical engravers and substitutes the laser assembly for the chuck, collet and/or spindle assembly of the mechanical engraver. Existing mechanical engraver control processing is be utilized for movement of the engraver.

Jones, et al. U.S. Pat. No. 4,564,736, issued in 1986, disclose a hand-held laser marking tool which is coupled to a laser system via a quartz fiber-optic cable to permit use of a solid state pulsed laser with a hand-held stylus for manual engraving and/or marking of a workpiece. This patent is illustrative of a portable laser system in which the moveable laser tool is connected to a stationary laser system.

Garnier, et al., U.S. Pat. No. 4,985,780, issued in 1991, disclose a laser engraving device in which an electronic controller controls two carriages for movement of a laser beam delivery system in both the x and y directions. The carriage system employs two servo motors which are controlled by the controller to move the laser beam delivery system. The laser beam delivery system includes a series of mirrors. A first mirror receives the laser beam from the laser source and orients the beam perpendicular to the direction of output. A second mirror receives the reflected beam and directs it in a direction parallel to the direction of the initial laser beam output, but in a direction opposite from that of the original output direction. A third mirror reflects the received laser beam in a direction perpendicular to the incident received beam and a fourth mirror receives the reflected beam and directs it perpendicular into a focusing lens. The focusing lens focuses the beam onto a workpiece to be engraved. The laser beam delivery source is a stationary unit and the mirror and focusing optics are moveable on the x, y carriages. This patent is cited as an example of a moveable engraving beam which is carried on an x, y gantry carriage system to mark a workpiece. It is analogous to the construction of a mechanical engraver as it would be adapted for laser engraving purposes. There is no disclosure in this patent, however, that the system of this patent could be retrofit to a mechanical engraver.

Macken, U.S. Pat. No. 4,480,169, issued in 1984, discloses a non-contact laser engraving device. The device consists generally of a workpiece and a reflecting mirror which carries a design image and acts as a pattern for the laser beam to reproduce the design image onto the workpiece. Both the reflecting mirror and the workpiece are carried on a moveable tray. The laser beam is focused onto a first mirror which reflects the laser beam onto the pattern mirror and the patterned mirror reflects the laser beam from the mirror surface onto a second reflecting mirror. A lens focuses the reflected beam onto a third reflecting mirror, which reflects the beam onto the workpiece to reproduce the stencil image. This patent describes a laser engraver which employs stationary optics, a stationary laser beam with a moveable workpiece for non-contact laser engraving.

Heller, et al. U.S. Pat. No. 3,588,439, issued in 1971, disclose a pulsed laser engraving system which permits the surface of a workpiece to be engraved across its entire surface with coherent light which passes through a predetermined masking pattern. The patent discloses a stationary workpiece and a stationary optics system for engraving the workpiece.

Nakano, U.S. Pat. No. 4,758,848, issued in 1988, discloses a laser engraving apparatus for marking a pattern with a laser beam. The laser beam which is not utilized for the pattern marking is fed back to a previous stage to increase the energy efficiency of the laser beam. The apparatus consists of a laser oscillator and a coupler attached to the laser oscillator. A collimator is connected to the laser oscillator through an optical fiber connected to the coupler. A polarizer is positioned in the path of the laser beam which is emitted from the collimator and an expander, composed of a concave lens and a convex lens, is positioned in the path of the laser beam emitted from the polarizer. A liquid crystal display is interposed in the path of the laser beam from the lenses and functions as a light valve or mask to generate the pattern to be marked on the article. A beam analyzer is positioned at a predetermined angle to the laser beam path from the liquid crystal device and a lens is provided for focusing the laser beam passed through the analyzer to mark the pattern on the article. This apparatus is directed generally to an apparatus to mark a pattern based upon the mask generated by the LCD device and to provide an increase in energy efficiency of laser usage for the laser energy not utilized for marking purposes.

Sorkoram, U.S. Pat. No. 4,851,061, issued in 1989, discloses a laser device for cutting thermoplastic materials. The device consists generally of a controller which operates the laser cutting tool to generate a pattern which is cut from a thermoplastic workpiece. The pattern to be created in the thermoplastic material is derived from programmed coordinates which are stored in the controller. The laser cutting tool responds to the controller by being displaced on a cutting table in both the x and y axis. While the manner in which the cutting tool is moved is not specifically disclosed, the patent to Garnier, et al. discloses a type of apparatus which can be used for x, y axis movement with a laser cutting head. This patent is primarily directed to an underlying cutting table support consisting of a plurality of honeycombed chambers through which the laser may be exhausted via a vacuum source. This patent is illustrative of a type of laser cutting head which is known in the art.

Finally, patents to Johnson, et al., U.S. Pat. No. 2,810,960, issued in 1957, Sicking, et al., U.S. Pat. No. 3,353,273, issued in 1967, and Sovar, et al., U.S. Pat. No. 3,339,279, also issued in 1967, illustrate conventional mechanical engravers as are known in the art. The mechanical engravers each employ a stylus which is held in a collet or chuck and connected to a vacuum source for removing shavings from the engraved work.

The current state of the art falls short of providing a laser retrofit assembly to convert mechanical engravers to laser engravers without changing control processing of the mechanical engraver. While it is known to use a hand-held portable laser stylus is known in the art as represented by the Jones, et al. patent, wherein the laser is hooked to a stationary laser oscillator via optical cables, and use a laser stylus mounted on an x, y axis gantry as shown by Garnier, et al, there are no current systems which enjoy the features and advantages of the present invention.

SUMMARY OF THE INVENTION

According to a broad aspect of the invention there is provided a laser assembly adapted to retrofit conventional industrial mechanical engravers of the type having chuck, collet or stylus movably mounted on a gantry positioned over a stationary or movable workpiece bed.

It is another aspect of the invention to provide a laser assembly which may consist either of a laser oscillator moveable with the mechanical engraver gantry, or through the use of a stationary laser oscillator and optics moveable with the mechanical engraver gantry.

It is a further aspect of the invention to provide a laser assembly adapted to integrate with existing controllers of industrial mechanical engravers, receive a z-axis control signal, modulate the z-axis control signal and initiate laser firing.

It is another aspect of the invention to employ the existing controllers of industrial mechanical engravers to control movement of the laser assembly mounted on the mechanical engraver gantry.

It is a more specific aspect of the invention to provide a pulse generator linked to the laser and an adjustable first pulse suppression circuit to provide a pulse delay used to minimize or eliminate the first pulse of the laser until initiation of coordinating movement of the workpiece or laser assembly relative to the workpiece.

It is another more specific aspect of the invention to provide a laser assembly which minimizes the use of mirrors and focusing lenses in the path of the laser beam, which tend to degrade beam energy at the workpiece.

These and other objects, features and advantages of the present invention will become more apparent to those skilled in the art from the following, more detailed, description of the present invention taken with the accompanying Figures, in which like features are identified by like reference numerals.

BRIEF DESCRIPTION OF THE DRAWINGS

FIG. 1 is a perspective view of an exemplary industrial mechanical engraving system retrofit with the laser assembly of the present invention.

FIG. 2 is a partial perspective view of a laser apparatus in accordance with a preferred embodiment of the present invention.

FIG. 3 is an end elevational view of the laser apparatus of FIG. 2 in accordance with a preferred embodiment of the present invention.

FIG. 4 is a diagrammatic side elevational cross-sectional view taken along line 4—4 of FIG. 3.

FIG. 5 is a flow diagram of the control processing of the laser retrofit assembly of the present invention.

DETAILED DESCRIPTION OF THE PREFERRED EMBODIMENTS

Figure 6:
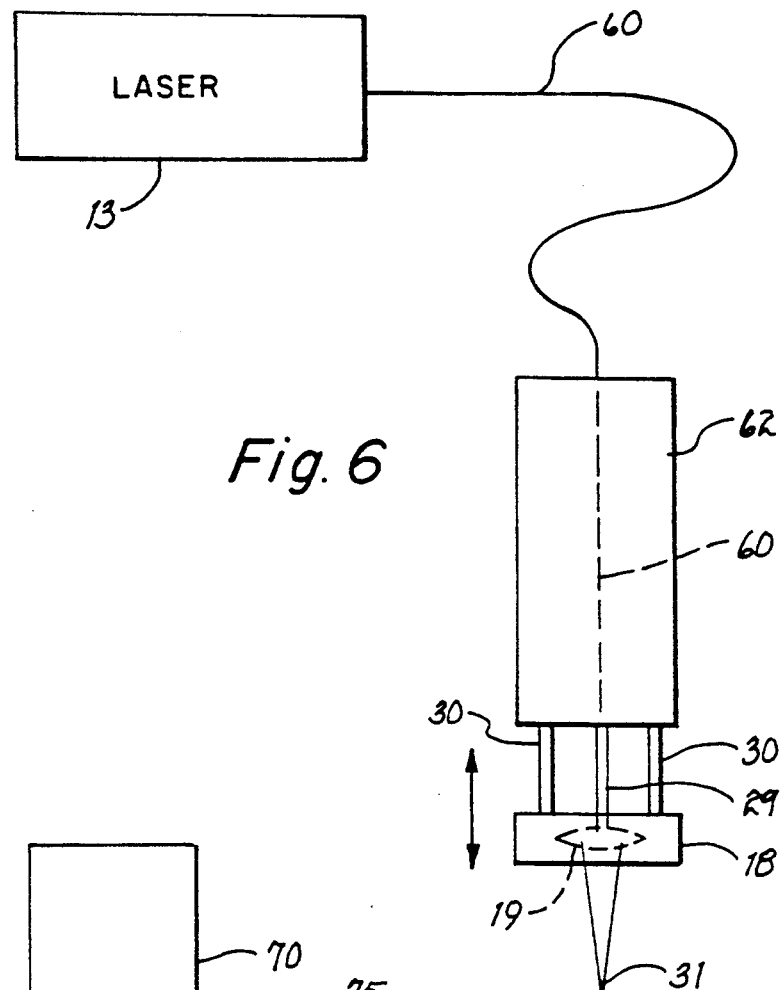
FIG. 6 is a diagrammatic view of a laser retrofit assembly in accordance with a second preferred embodiment of the present invention.

The laser assembly 10 of the present invention is illustrated in FIG. 1 in association with an industrial mechanical engraver sold by Dahlgren as the SYSTEM 300. The depicted mechanical engraver is shown by way of example only, and is not intended to, nor should be construed as limiting the invention.

Industrial mechanical engravers typically consist of a preprogrammed central processing unit 1 which receives input from keyboard 2 to interact with control processing software resident on the central processing unit 1. The central processing unit 1 is electronically coupled to an engraver controller 3 The engraver controller 3 receives software command input from the central processing unit 1 and controls movement of a carriage member 6 mounted on a gantry 7 and a workpiece bed 5. In the engraver illustrated in FIG. 1, the carriage member 6 moves in the x-axis, while the workpiece bed 5 moves in the y-axis. Those skilled in the art will understand, however, that other industrial mechanical engravers, suitable for use with the present invention, employ carriage members 6 mounted on gantries capable of movement in both the x- and y-axes, or that the workpiece bed 5 may be capable of movement in the x- and y-axes while the carriage member 6 is stationary.

Each industrial mechanical engraver currently in production utilizes the controller 3 to provide signals for controlling movement of either the carriage member 6 or the workpiece bed 5 in at least one of the x- and y-axes. The controller 3 also provides a z-axis signal to actuate z-axis movement and initiate rotation of the engraving spindle (not shown).

The laser assembly 10 replaces a chuck, collet or stylus (not shown) which is typically associated with the carriage member 6. Laser assembly 10 is mounted on the carriage member 6, such that x- or y-axis control signals from controller 3 to the carriage member 6 cause corresponding movement of laser assembly 10. In the embodiment illustrated in FIG. 1, laser assembly 10 is mounted above a workpiece 12, with the workpiece 12 being carried on a moveable or stationary workpiece bed 5. Workpiece bed 5 is, in turn, mounted on a base member 4, which supports both the workpiece bed 5, the gantry 7 and all other associated drive motors, braces, supports, etc.

A laser controller 8 is provided and contains the laser power supply and the laser controls, including, for example an on-off switch, an emergency shut off, a variable time delay and a pulse generator. Laser controller 8 is electrically coupled to the z-axis output of the engraver controller 3 and to the laser oscillator via electrical connector 42.

Turning now to the first embodiment of the invention, illustrated in FIGS. 2–4, there is provided the laser assembly 10 adapted for vertical mounting over a workpiece 10 as illustrated in FIG. 1. This type of laser assembly is particularly well-suited for use in engraving workpieces made of organic materials, such as wood, stone, leather, etc., where lower powered lasers, such as a 20 Watt $CO_2$ laser of the type manufactured by Synrad, Inc. under U.S. Pat. Nos. 4,837,772 and 4,805,182, may be used. The laser assembly 10 consists generally of a laser oscillator 13, having heat sinks 34 associated with the laser 13. Laser oscillator 13 is mounted in an external housing 14 having an end plate 15 coupled to the housing 14. End plate 15 is fitted with three basic components. First, a connector 16, which couples to the carriage member 6 of the mechanical engraver, is provided. Second, focusing optics 18 are provide to receive the laser beam 29, generated by the laser oscillator 13, through an aperture 28 in the end plate 15, and focus 31 the laser beam onto the workpiece. Third, a shutter 22 is provided as a safety gate to block emission of the laser beam 29.

The connector 16 consists of any type of coupling required for mounting the laser assembly 10 on the carriage member 6. Those familiar with conventional mechanical engravers will appreciate that approximately 20-25 different types of collets, chucks or spindles are employed on conventional mechanical engravers. For example, the Dahlgren SYSTEM 300 employs a clamp which frictionally engages around a cylindrical chuck which receives the engraving stylus. The Dahlgren clamp is configured as a hinged arm having a thumb-screw on a free end of the arm, which engages a threaded bore in the carriage member 6, to secure the cylindrical chuck onto the carriage member 6. As illustrated in FIGS. 2-3 in a non-limiting example, connector 16 is configured to mount onto the clamp of the Dahlgren SYSTEM 300, and is a cylindrical shank which is of similar size to the cylindrical chuck of the Dahlgren mechanical engraver. Thus, engagement of the illustrated connector 16 into the Dahlgren clamp serves to mount the laser assembly 10 of the present invention onto the Dahlgren mechanical engraver carriage member 6 or mounts compatible with the Dahlgren carriage member 6. Those skilled in the art will appreciate, however, that due to the numerous types of chucks, collets or spindles used with mechanical engravers, the selection of a particular connector 16 will depend upon the mechanical engraver to be retrofit.

Focusing optics 18 consist generally of a focusing lens 19 mounted in lens mount 18, with lens mount 18 being movably connected to track members 30. Lens mount 18 is also connected to arm 24, which in conjunction with handle 26, permit reciprocating movement of lens mount 18 along track member 30. The reciprocal movement of lens mount 18 alters the position of lens 19 relative to the workpiece, thereby focusing or defocusing the laser beam 29 emitting from aperture 28 on the workpiece 12. A locknut, or other locking means, is used to secure a desired position of the arm 24, and hence the lens 19, in a locked position for engraving the workpiece 12. The above-described focusing optics 18 are preferably employed in each of the embodiments described herein.

Additionally, a safety shutter 22 is mounted on end plate 15. Safety shutter 22 is actuated by an actuating motor 20, which is connected to an emergency shut-off switch on the laser controller 8. Safety shutter 22 impinges upon and blocks the path of the laser beam 29 emitted from aperture 28, thereby shutting off the emission of the laser beam 29 through the focusing optics 18.

A novel feature of the present invention is the provision of exhaust/cooling vents 34 in the end plate 15. Most mechanical engravers use pressurized air to clear the workpiece 12 of shavings. Many lasers employ liquid cooling to maintain the electronics at optimum operational temperatures. The use of liquid cooled lasers in a mechanical engraver retrofit would not be desirable due to the required gantry or laser movement. Moreover, it is often times undesirable to require that the engraver be positioned near a water source for the laser cooling system. Further, governmental regulations require that fumes generated by laser ablation be exhausted and filtered. Thus, in accordance with a preferred embodiment of the invention, there is provided a single vacuum means to exhaust fumes generated during laser operation and cool the laser oscillator 13. This is accomplished by providing a vacuum pump (not shown) connected to the laser assembly 10 via a vacuum line 11. The space between housing 14 and the heat sinks 34 of the laser oscillator 13 is utilized to draw a vacuum air flow 40 through the vents 32, across the heat sinks 34, thereby cooling the laser oscillator 13, and exhaust the fumes through exhaust opening 41 to a filter associated with a vacuum pump (not shown). Thus, the vacuum line 11 serves a dual purpose of exhausting fumes resulting from ablation of the workpiece 12 and cooling the laser oscillator 13.

Operation of the laser assembly 10 adapted to retrofit mechanical engravers is outlined in FIG. 5. As noted above, the mechanical engraver controller 3 generates x-axis 51, y-axis 52 and z-axis 50 signals. X-axis 51 and y-axis 52 signals control workpiece position 53 in response to software commands coordinated with the mechanical engraver controller 3. The z-axis signal 50 is read by the laser controller 8. The z-axis signal is generated by the mechanical engraver controller 3 as the on/off signal for the engraving stylus. The laser controller 8 receives the z-axis signal and modulates the signal via a delay circuit 54 to delay laser firing to compensate for the delay in positioning of the workpiece 12. In accordance with the preferred embodiment of the invention, delay circuit 54 is adjustable in millisecond increments between 0 and 1 second delay time coordinated with movement of the workpiece 12 initiated by the x- and y-axis signals 51, 52. After the desired delay, the z-axis signal 54 is passed to a pulse generator 55, which actuates firing of the laser oscillator 56 to the workpiece. By interposing a timing delay 54 in the z-axis signal cycling, the uneven first laser pulse marking is minimized and a more uniform engraved image is achieved.

Figure 7:
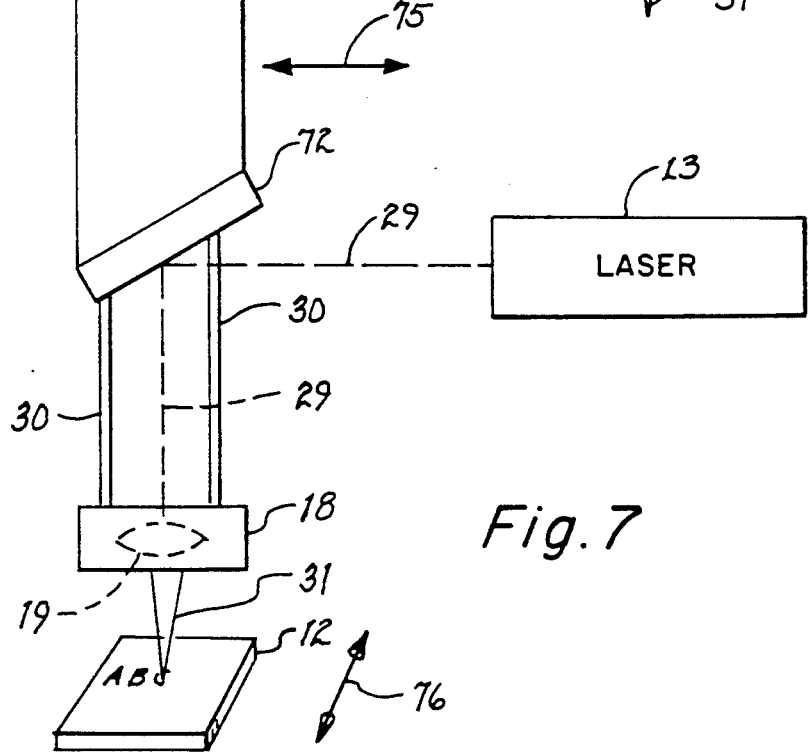
FIG. 7 is a diagrammatic view of a laser retrofit assembly in accordance with a third preferred embodiment of the present invention.

Turning to FIGS. 6 and 7 there are illustrated the second and third embodiments of the invention. FIG. 6 illustrates an adaptation of the above-described laser assembly 10 which employs a stationary laser oscillator 13, which is connected to the laser controller 8 and engraver controller 3 in the above-described manner. In this second embodiment, the laser oscillator 13 generates a laser beam 29, which is conveyed via optical cabling 60 to the focusing optics 18. The optical cabling 60 is coupled to or associated with a chuck 62 which is mounted onto the carriage member 6 of the mechanical engraver in a manner as described above. The focusing optics 18 are preferably like that described above, namely, the laser beam 29 is emitted from the optical cabling 60 and focused via focusing optics 18 to a focused beam 31 onto the workpiece. The focusing optics 18 are reciprocally adjustable, on tracks 30, relative to the chuck 62 to focus or defocus the laser beam 29 onto the workpiece 12. The laser assembly 10 represented in FIG. 6 is particularly well-suited for adapting mechanical engravers which employ a stationary workpiece and an overhead gantry moveable in both the x- and y-axes, but may be used as a retrofit for virtually any type of mechanical engraving system.

A third embodiment of the invention is illustrated with reference to FIG. 7. The embodiment of FIG. 7 is particularly well-suited to engraving applications where higher powered, and hence more massive, laser oscillators 13 are required. According to this third embodiment, the laser oscillator 13 is placed laterally to the workpiece in the x-axis, and projects an x-axis laser beam 29. Laser beam 29 is deflected by a mirror 72 mounted onto chuck 72. Mirror 72 deflects laser beam 29 into the focusing optics 18, which focus the laser beam 29 onto workpiece 12 in a manner like that already described. The laser oscillator 13 is preferably stationary and the chuck 75 is moved in the x-axis 75 by the mechanical engraver carriage member 6. The workpiece 12 is moved in the y-axis 76, by the engraver controller 3 y-axis signal.

Those skilled in the art will understand that the third embodiment of the invention may be easily adapted for gantry systems which move the carriage member 6 in both the x- and y-axis by positioning the laser oscillator 13 to fire the laser beam in the y-axis and interposing an additional mirror in the path of the laser beam 29, to receive the y-axis laser beam and deflect the laser beam to the x-axis, where it is intercepted by mirror 72 mounted on chuck 70, to deflect the laser beam 29 onto the workpiece 12.

Thus, the best modes contemplated for the present invention have been fully described, with reference to three embodiments contemplated for the invention. Those skilled in the art will understand and appreciate that variations and modifications may be made and still come within the spirit and scope of the invention, which is to be limited only by the claims appended hereto. For example, changes in laser types, laser power, optics and optical materials, connectors between the laser assembly 10 and the carriage members 6 of various mechanical engravers, may be made and still fall within the scope of the present invention.

We claim:

1. Laser apparatus for adapting mechanical engravers of the type having an engraving stylus, at least one of a moveable stylus carriage or a moveable workpiece bed, and a mechanical engraver controller generating signals for controlling movement of the at least one of a moveable stylus carriage or a moveable workpiece bed and activating movement of the engraving stylus, the laser apparatus comprising:

laser means for generating a laser beam;

focusing means for receiving the generated laser beam and focusing the generated laser beam directly onto a workpiece;

means for electrically coupling the laser means to the mechanical engraver controller and receiving the stylus activation signal from the mechanical engraver controller; and timing means for adjustably delaying the received stylus activation signal and firing the laser means in response to the delayed stylus activation signal.

2. The laser apparatus according to claim 1, further comprising shutter means for interrupting the laser beam generated from the laser means.

3. The laser apparatus according to claim 1, further comprising vacuum means, coupled to the laser means, for evacuating fumes from the laser beam and cooling the laser means.

4. The laser apparatus according to claim 1, further comprising coupling means for coupling the laser means to the moveable stylus carriage member of the mechanical engraver.

5. The laser apparatus according to claim 1, wherein said laser means further comprises a laser oscillator, an enclosing housing, an end plate having an aperture for emitting the laser beam generated by the laser oscillator through the end plate, and means for operably coupling the focusing means to the end plate.

6. The laser apparatus according to claim 5, wherein said focusing means further comprises at least one focusing lens, a lens housing and said means for operably coupling the focusing means to the end plate further comprises at least one track member reciprocally connected to the lens housing.

7. The laser apparatus according to claim 5, wherein the end plate further comprises at least one vent opening in communication with heat sinks associated with the laser oscillator.

8. The laser apparatus according to claim 7, further comprising vacuum means operably associated with the laser means, the vacuum means for evacuating fumes from the laser beam by evacuating air containing the fumes from the area of the workpiece, through the at least one vent opening, and across the heat sinks associated with the laser oscillator, thereby cooling the laser means.

9. The laser apparatus according to claim 1, wherein said laser means further comprises:

a laser oscillator;

at least one optical fiber optically coupled to a laser beam generated by the laser oscillator and to the focusing means; and means for connecting the optical fiber and the focusing means to the moveable stylus carriage member of the mechanical engraver.

10. The laser apparatus according to claim 9, wherein said laser means further comprises a laser oscillator, an enclosing housing, an end plate having an aperture for emitting the laser beam generated by the laser oscillator through the end plate, and means for operably coupling the focusing means to the end plate.

11. The laser apparatus according to claim 10, wherein the focusing means further comprises at least one focusing lens, a lens housing and said means for operably coupling the focusing means to the end plate further comprises at least one track member reciprocally connected to the lens housing.

12. The laser apparatus according to claim 1, wherein said laser means further comprises:
   a laser oscillator; and
   at least one mirror coupled to the moveable stylus carriage member of the mechanical engraver, said at least one mirror being in optical communication with the laser oscillator to receive the generated laser beam from the laser oscillator and deflect the laser beam to the focusing means.

13. The laser apparatus according to claim 12, wherein said laser means further comprises a housing enclosing the laser oscillator, an end plate having an aperture for emitting the laser beam generated by the laser oscillator through the end plate, and means for operably coupling the focusing means to the end plate.

14. The laser apparatus according to claim 13, wherein the focusing means further comprises at least one focusing lens, a lens housing and said means for operably coupling the focusing means to the end plate further comprises at least one track member reciprocally connected to the lens housing.

15. Laser engraving method, comprising the steps of:
   providing a mechanical engraver of the type having an engraving stylus, at least one of a moveable stylus carriage or a moveable workpiece bed, and a mechanical engraver controller generating signals for controlling movement of the at least one of a moveable stylus carriage or a moveable workpiece bed and activating movement of the engraving stylus;
   coupling laser means for generating a laser beam to the mechanical engraver and replacing the engraving stylus with the laser means;
   coupling the laser means to the mechanical engraver controller;
   receiving the stylus activation signal from the mechanical engraver controller;
   adjustably delaying the received stylus activation signal and firing the laser means in response to the delayed stylus activation signal thereby generating a laser beam; and
   focusing the generated laser beam directly onto a workpiece, thereby engraving the workpiece with the focused laser beam.

* * * * *